United States Patent
Nishiguchi et al.

(10) Patent No.: US 6,734,260 B2
(45) Date of Patent: May 11, 2004

(54) CATIONIC COATING COMPOSITION

(75) Inventors: Shigeo Nishiguchi, Hiratsuka (JP); Koji Kamikado, Yokohama (JP); Susumu Midogochi, Hiratsuka (JP); Akira Tominaga, Chigasaki (JP); Akihiko Shimasaki, Hiratsuka (JP); Hideki Iijima, Shiroyama-machi (JP)

(73) Assignee: Kansai Paint Co., Ltd., Hyogo-ken (JP)

( * ) Notice: Subject to any disclaimer, the term of this patent is extended or adjusted under 35 U.S.C. 154(b) by 0 days.

(21) Appl. No.: 10/294,564

(22) Filed: Nov. 15, 2002

(65) Prior Publication Data

US 2003/0106804 A1 Jun. 12, 2003

(30) Foreign Application Priority Data

Nov. 22, 2001 (JP) ........................................ 2001-357474

(51) Int. Cl.$^7$ ............................................. C08G 65/331
(52) U.S. Cl. ........................ 525/405; 525/403; 525/406; 525/390; 525/398; 525/399; 528/103; 528/107; 528/110; 528/113; 428/413; 205/317
(58) Field of Search ................................ 525/390, 398, 525/399, 403, 405, 406, 523, 532; 523/414, 415, 417, 420; 524/901; 528/106, 107, 110, 113; 427/386; 205/317, 235

(56) References Cited

U.S. PATENT DOCUMENTS

| 4,291,137 | A | * | 9/1981 | Nakate et al. ............... 525/162 |
| 4,396,649 | A | | 8/1983 | Bailey et al. |
| 5,095,051 | A | | 3/1992 | Chung et al. |
| 6,239,245 | B1 | * | 5/2001 | Morita et al. .................. 528/15 |
| 2002/0018163 | A1 | * | 2/2002 | Yamamoto et al. .......... 349/122 |
| 2003/0221964 | A1 | * | 12/2003 | Kasahara et al. ............ 204/484 |

FOREIGN PATENT DOCUMENTS

EP          1 111 013          6/2001

OTHER PUBLICATIONS

Machine Translation, JP 07–011106, Katsukawa et al., Jan. 13, 1995.*

* cited by examiner

Primary Examiner—Daniel S. Metzmaier
Assistant Examiner—Christopher Keehan
(74) Attorney, Agent, or Firm—Wenderoth, Lind & Ponack, LLP

(57) ABSTRACT

The present invention provides a cationic coating composition capable of forming a coating film which is excellent in an electrodepositablly coating property and an adhesive property toward a rust preventive steel plate, a corrosion resistance and a low temperature curability. The cationic coating composition described above comprises as a vehicle component, a xylene-formaldehyde resin-modified, amino group-containing epoxy resin obtained by reacting an epoxy resin (A) having an epoxy equivalent of 180 to 2500 with a xylene-formaldehyde resin (B) and an amino group-containing compound (C).

25 Claims, No Drawings

CATIONIC COATING COMPOSITION

The present invention relates to a cationic coating composition, more specifically to a cationic coating composition capable of forming a cured coating film which is excellent in a corrosion resistance and a rust preventive steel plate aptitude.

A cationic coating composition is used mainly as an electrodepositable coating composition for wide-ranged uses including an undercoating composition for car bodies, and those having various characteristics have so far been developed. Proposed as a conventional cationic coating composition is, for example, a coating composition having an excellent corrosion resistance and improved in an electrodepositable coating aptitude and an adhesive property toward a rust preventive steel plate, in which used as a vehicle component is a modified epoxy resin obtained by internally plasticizing an epoxy resin having an amino group and/or a quaternary ammonium salt group as a hydrophilic group with a plasticizer, such as polyamide, polyester and polyether and blended is a rust preventive pigment such as lead chromate, basic lead silicate and strontium chromate. In recent years, however, hazardous compounds such as lead compounds and chromium compounds are restricted in use thereof from a viewpoint of pollution problems, and techniques which can improve a corrosion resistance of the coating film without blending such hazardous compounds are expected to be developed.

On the other hand, an epoxy resin which is internally plasticized with a plasticizer tends to reduce a corrosion resistance of the coating film, and therefore it is considered to use as a base resin an epoxy resin containing no plasticizing modifier to thereby elevate the corrosion resistance. However, this provides the problem that the electrodepositable coating aptitude against a rust preventive steel plate is reduced. In order to solve such problems, it is proposed that added as a plasticizer for an epoxy resin are, for example, polyol resins such as polyesterpolyols, polyetherpolyols, polyurethanepolyols and acrylpolyols; and polymers including polyolefins such as polybutadiene and polyethylene. Involved therein, however, is the problem that these materials not only do not have a sufficiently high compatibility with epoxy resins and are not effective so much for improving the electrodepositable coating aptitude against a rust preventive steel plate but also reduce a corrosion resistance of the coating film when added in a large amount.

An object of the present invention is to provide a cationic coating composition based on an epoxy resin and capable of forming a coating film which is excellent both in a corrosion resistance and the electrodepositable coating aptitude against a rust preventive steel plate without using hazardous compounds such as lead compounds and chromium compounds.

Intensive researches repeated by the present inventors have resulted in finding that the object described above can be achieved by using as a vehicle component in a cationic coating composition, a xylene-formaldehyde resin-modified, amino group-containing epoxy resin obtained by reacting an epoxy resin with a xylene-formaldehyde resin and an amino group-containing compound, and they have come to complete the present invention.

Thus, the present invention provides a cationic coating composition comprising as a vehicle component, a xylene-formaldehyde resin-modified, amino group-containing epoxy resin obtained by reacting an epoxy resin (A) having an epoxy equivalent of 180 to 2500 with a xylene-formaldehyde resin (B) and an amino group-containing compound (C).

The cationic coating composition of the present invention shall be explained below in further details.

Epoxy Resin (A)

An epoxy resin obtained by the reaction of a polyphenol compound with epihalohydrin, for example, epichlorohydrin is particularly suited as an epoxy resin used as a starting material in the production of the modified epoxy resin used as the vehicle component in the coating composition of the present invention from a corrosion resistance of the coating film.

The polyphenol compounds which can be used for producing the above epoxy resin include, for example, bis(4-hydroxyphenyl)-2,2-propane (bisphenol A), 4,4-dihydroxybenzophenone, bis(4-hydroxyphenyl)methane (bisphenol F), bis(4-hydroxyphenyl)-1,1-ethane, bis(4-hydroxyphenyl)-1,1-isobutane, bis(4-hydroxy-tert-butyl-phenyl)-2,2-propane, bis(2-hydroxynaphthyl)methane, tetra (4-hydroxyphenyl)-1,1,2,2-ethane, 4,4-dihydroxy-diphenylsulfone (bisphenol S), phenol novolak and cresol novolak.

Particularly suited as the epoxy resin obtained by the reaction of a polyphenol compound with epihalohydrin is a compound derived from bisphenol A, which is represented by the following formula:

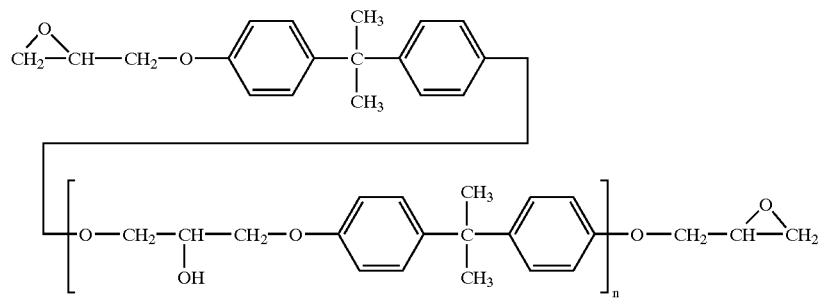

wherein n is 1 to 8.

The epoxy resin (A) can have an epoxy equivalent falling in a range of generally 180 to 2,500, preferably 200 to 2,000 and more preferably 400 to 1,500. Further, it has suitably a number average molecular weight falling in a range of generally at least 200, particularly 400 to 4,000 and more particularly 800 to 2,500.

Commercially available products of such epoxy resin include, for example, products which are marketed from Japan Epoxy Resin Co., Ltd. in the trade names of Epikote 828EL, ditto 1002, ditto 1004 and ditto 1007.

Xylene-formaldehyde Compound (B)

In the present invention, the xylene-formaldehyde resin (B) has preferably a phenolic hydroxyl group capable of reacting with an epoxy group and is useful for plasticization (modification) of the epoxy resin (A) described above, and it can be produced, for example, by subjecting xylene, formaldehyde and, if necessary, phenols to condensation reaction in the presence of an acid catalyst.

Capable of being given as examples of the formaldehyde described above are compounds which generate formaldehyde such as formalin, paraformaldehyde and trioxane which are readily available in an industrial scale. When a polymer such as paraformaldehyde and trioxane is used in the present invention, a blending amount thereof is regulated based one molecule of formaldehyde.

Further, the phenols described above include monovalent or divalent phenol compounds having two or three reaction sites, and to be specific, they include, for example, phenol, cresols (o-cresol, m-cresol and p-cresol), paraoctylphenol, nonylphenol, bisphenolpropane, bisphenolmethane, resorcin, pyrocatechol, hydroquinone, para-tert-butylphenol, bisphenolsulfone, bisphenol ether and paraphenylphenol. They can be used alone or in combination of two or more kinds thereof. Among them, phenol and cresols are particularly suited.

The acid catalyst used for condensation reaction of xylene, formaldehyde and, if necessary, phenols includes, for example, sulfuric acid, hydrochloric acid, paratoluenesulfonic acid and oxalic acid, and usually sulfuric acid is particularly suited. A use amount thereof, as usually diluted with water contained in a formaldehyde aqueous solution, can be controlled in a range of 10 to 50% by weight in terms of a concentration in the aqueous solution.

The condensation reaction can be carried out, for example, by heating at a temperature at which xylene, phenols, water and formalin present in the reaction system are refluxed, usually about 80 to about 100° C., and it can be finished in 2 to 6 hours.

Xylene, formaldehyde and, optionally and preferably, phenols are reacted by heating under the condition described above in the presence of the acid catalyst, whereby the xylene-formaldehyde resin can be produced. The xylene-formaldehyde resin can be produced as well by reacting a xylene-formaldehyde resin produced in advance with phenols in the presence of the acid catalyst.

The xylene-formaldehyde resin thus obtained has preferably a phenolic hydroxyl group and can have a viscosity falling in a range of usually 20 to 50,000 centipoise (25° C.), preferably 30 to 15,000 centipoise (25° C.). It has preferably a phenolic hydroxyl group equivalent falling in a range of usually 100 to 50,000, particularly 200 to 10,000.

Amino Group-containing Compound (C)

In the present invention, the amino group-containing compound (C) which is reacted with the epoxy resin (A) is a cationic property-providing component used for introducing an amino group into an epoxy resin base substance to make the above epoxy resin cationic, and the compounds having at least one active hydrogen reacting with an epoxy group are used.

The amino group-containing compound used for such purpose includes mono- or di-alkylamines such as monomethylamine, dimethylamine, monoethylamine, diethylamine, monoisopropylamine, diisopropylamine, monobutylamine and dibutylamine; alkanolamines such as monoethanolamine, diethanolamine, mono(2-hydroxypropyl)amine, di(2-hydroxypropyl)amine, tri(2-hydroxypropyl)amine, monomethylaminoethanol and monoethylaminoethanol; alkylenepolyamines such as ethylenediamine, propylenediamine, butylenediamine, hexamethylenediamine, tetraethylenepentamine, pentaethylenehexamine, diethylaminopropylamine, diethyelenetriamine and triethylenetetramine, and ketiminized compounds of these polyamines; alkyleneimines such as ethyleneimine and propyleneimine; and cyclic amines such as piperazine, morpholine and pyrazine.

Xylene-formaldehyde Resin-modified, Amino Group-containing Epoxy Resin

The xylene-formaldehyde resin-modified, amino group-containing epoxy resin used as a vehicle in the coating composition of the present invention can be produced by addition-reacting the xylene-formaldehyde resin (B) and the amino group-containing compound (C) to the epoxy resin (A) described above by a known method per se. The reaction of the xylene-formaldehyde resin (B) and the amino group-containing compound (C) to the epoxy resin (A) can be carried out in any order. In general, the xylene-formaldehyde resin (B) and the amino group-containing compound (C) are suitably reacted to the epoxy resin (A) at the same time.

The addition reaction described above can be carried out usually in a suitable solvent at a temperature of about 80 to about 170° C., preferably about 90 to about 150° C. for one to 6 hours, preferably 1 to 5 hours. The solvent described above includes, for example, hydrocarbons such as toluene, xylene, cyclohexane and n-hexane; esters such as methyl acetate, ethyl acetate and butyl acetate; ketones such as acetone, methyl ethyl ketone, methyl isobutyl ketone and methyl amyl ketone; amides such as dimethylformamide and dimethylacetamide; alcohols such as methanol, ethanol, n-propanol and iso-propanol; and mixtures thereof The use proportions of the respective reaction components in the addition reaction described above shall not strictly be restricted and can suitably be changed according to uses of the coating composition. The epoxy resin (A), the xylene-formaldehyde resin (B) and the amino group-containing compound (C) fall suitably in the following ranges based on the total solid matter weight of the three components described above:

Epoxy resin (A):
generally 50 to 90% by weight, preferably 50 to 85% by weight and more preferably 53 to 83% by weight Xylene-formaldehyde resin (B):
generally 5 to 45% by weight, preferably 6 to 43% by weight and more preferably 6 to 40% by weight Amino group-containing compound (C):
generally 5 to 25% by weight, preferably 6 to 20% by weight and more preferably 6 to 18% by weight Further, according to the present invention, capable of being used as the vehicle component is a xylene-formaldehyde resin-modified, amino group-containing epoxy resin prepared by reacting the epoxy resin (A), the xylene-formaldehyde resin (B) and the amino group-containing compound (C) and in addition thereto, further a polyol compound (D) obtained by adding caprolactone to a compound containing plural active hydrogen groups.

Polyol Compound (D)

In the present invention, the polyol compound (D) is used for plasticizing (modifying) the epoxy resin (A) described above and is produced by adding caprolactone (b) to a compound (a) having plural active hydrogen groups.

An active hydrogen group means an atomic group containing at least one active hydrogen and includes, for example, an alcoholic hydroxyl group, a primary amino group and a secondary amino group. The compound (a) having plural groups of such active hydrogen group in a molecule includes, for example:

(i) low molecular weight polyols,
(ii) linear or branched polyetherpolyols,
(iii) linear or branched polyesterpolyols,
(iv) amine compounds having a primary amino group and/or a secondary amino group or hydroxylamine compounds having a primary amino group and/or a secondary amino group in combination with a hydroxyl group.

These active hydrogen group-containing compounds (a) can have a number average molecular weight falling in a range of usually 62 to 5,000, preferably 62 to 4,000 and more preferably 62 to 1,500. The active hydrogen group-containing compound (a) is suitably a compound having at least two groups and less than 30 groups, particularly 2 to 10 groups of the active hydrogen groups per molecule on the average.

The low molecular weight polyol (i) described above is a compound having at least two alcoholic hydroxyl groups in a molecule, and to be specific, it includes, for example, diols such as ethylene glycol, propylene glycol, 1,3-butylene glycol, 1,4-butanediol, 1,6-hexanediol, diethylene glycol, dipropylene glycol, cyclohexane-1,4-dimethylol, neopentyl glycol, triethylene glycol and hydrogenated bisphenol A; triols such as glycerin, trimethylolethane and trimethylolpropane; tetrols such as pentaerythritol and α-methylglycoside; hexols such as sorbitol and dipentaerythritol; and octols such as sucrose.

The linear or branched polyetherpolyol (ii) described above can have a number average molecular weight falling in a range of usually 62 to 10,000, preferably 62 to 2,000, and to be specific, it includes, for example, polyethylene glycol, polypropylene glycol, polytetramethylene glycol, poly(ethylene·propylene) glycol, bisphenol A ethylene glycol ether and bisphenol A propylene glycol ether which are produced by ring-opening reaction of alkylene oxides (e. g., ethylene oxide, propylene oxide, butylene oxide and tetrahydrofuran).

The linear or branched polyesterpolyol (iii) described above can have a number average molecular weight falling in a range of usually 200 to 10,000, preferably 200 to 3,000, and to be specific, it includes, for example, compounds obtained by polycondensation reaction of organic dicarboxylic acids or anhydrides thereof with organic diols on the condition of organic diol excess. The organic dicarboxylic acid used in this case includes aliphatic, alicyclic or aromatic organic dicarboxylic acids having 2 to 44 carbon atoms, particularly 4 to 36 carbon atoms, for example, succinic acid, adipic acid, azelaic acid, sebacic acid, maleic acid, fumaric acid, glutaric acid, hexachloroheptane-dicarboxylic acid, cyclohexanedicarboxylic acid, o-phthalic acid, isophthalic acid, terephthalic acid, tetrahydrophthalic acid and tetrachlorophthalic acid. Further, in addition to these carboxylic acids, capable of being used in combination in small amounts are anhydrides of polycarboxylic acids having 3 or more carboxyl groups and adducts of unsaturated fatty acids.

The organic diol component includes, for example, alkylene glycols such as ethylene glycol, propylene glycol, butylene glycol, 1,4-butanediol, 1,6-hexanediol, and neopentyl glycol, and dimethylolcyclohexane. They may be used, if necessary, in combination with a small amount of polyol such as trimethylolpropane, glycerin and pentaerythritol.

The preceding amine compound having a primary amino group and/or a secondary amino group or amine compound (iv) having a primary amino group and/or a secondary amino group in combination with a hydroxyl group includes, for example, alkylamines such as butylenediamine, hexamethylenediamine, tetraethylene-pentamine and pentaethylenehexamine; alkanolamines such as monoethanolamine, diethanolamine, triethanolamine, mono (2-hydroxypropyl)amine and di(2-hydroxypropyl)amine; alicyclic polyamines such as 1,3-bisaminomethylcyclohexane and isophoronediamine; aromatic polyamines such as xylylenediamine, metaxylenediamine, diaminodiphenylmethane and phenylenediamine; alkylenepolyamines such as ethylenediamine, propylenediamine, diethylene-triamine and triethylenetetramine; and other amine compounds such as polyamides and polyamideamines which are derived from piperizine and these polyamines, amine adducts with epoxy compounds, ketimines and aldimines.

Among the compounds (a) having plural active hydrogen groups described above, suited are the compounds of (i), (ii) and (iv), particularly compounds selected from the group consisting of ethylene glycol, propylene glycol, 1,4-butanediol, 1,6-hexanediol, diethylene glycol, hydrogenated bisphenol A, glycerin, trimethylolethane, trimethylolpropane, pentaerythritol, dipentaerythritol, polyethylene glycol, polypropylene glycol, polytetramethylene glycol, poly(ethylene propylene) glycol, bisphenol A ethylene glycol ether, bisphenol A propylene glycol ether, butylenediamine, hexamethylenediamine, monoethanolamine, diethanolamine, triethanolamine, isophoronediamine, ethylenediamine, propylenediamine, diethylenetriamine and triethylenetetramine.

On the other hand, the caprolactone (b) which can be added to the compound (a) having plural active hydrogen groups includes γ-caprolactone, ε-caprolactone and δ-caprolactone, and ε-caprolactone is particularly suited.

The addition reaction of the compound (a) having plural active hydrogen groups and the caprolactone (b) described above can be carried out by a known method per se. To be specific, it can be carried out, for example, by heating the compound (a) having plural active hydrogen groups and the caprolactone (b) at a temperature of about 100 to about 250° C. for about one to about 15 hours in the presence of a catalyst including titanium compounds such as tetrabutoxytitanium and tetrapropoxytitanium, organic tin compounds such as tin octylate, dibutyltin oxide and dibutyltin laurate, and metal compounds such as stannous chloride.

In general, the catalyst described above can be used in an amount of 0.5 to 1,000 ppm based on the total amount of the compound (a) having plural active hydrogen groups and the caprolactone (b). The caprolactone (b) can be used in an amount falling in a range of usually 1 to 30 moles, preferably 1 to 20 moles and more preferably 1 to 15 moles per equivalent of the active hydrogen group (that is, per one active hydrogen) of the compound (a) having plural active hydrogen groups.

The polyol compound (D) thus obtained has together a high plasticizing performance based on the compound (a) having plural active hydrogen groups, a high compatibility with an epoxy resin based on (poly)caprolactone and a high reactivity attributable to a terminal hydroxyl group and therefore is very useful as an plasticizer for an epoxy resin for a coating material.

The polyol compound (D) can be added in a proportion falling in a range of usually 20 to 95% by weight, preferably 25 to 90% by weight in terms of the total of units originating in the caprolactone (b). Also, it can have a number average molecular weight falling in a range of usually 300 to 10,000, preferably 400 to 5,000.

The xylene-formaldehyde resin-modified, amino group-containing epoxy resin in which the polyol compound (D) is used as an additional reaction component can be produced in the same manner as described above. In general, the epoxy resin (A) is suitably reacted with the xylene-formaldehyde resin (B), the amino group-containing compound (C) and the polyol compound (D) at the same time.

The use proportions of the respective reaction components in the addition reaction described above shall not strictly be restricted and can suitably be changed according to uses of the coating composition. The epoxy resin (A), the xylene-formaldehyde resin (B), the amino group-containing compound (C) and the polyol compound (D) fall suitably in the following ranges based on the total solid matter weight of the four components described above:

Epoxy resin (A):
generally 50 to 85% by weight, preferably 50 to 80% by weight and more preferably 56 to 76% by weight Xylene-formaldehyde resin (B):
generally 5 to 45% by weight, preferably 6 to 40% by weight and more preferably 7 to 35% by weight Amino group-containing compound (C):
generally 5 to 25% by weight, preferably 6 to 20% by weight and more preferably 7 to 20% by weight Polyol compound (D):
generally 1 to 20% by weight, preferably 2 to 15% by weight and more preferably 2 to 13% by weight.

Cationic Coating Composition

The cationic coating composition provided by the present invention comprises as a vehicle, the xylene-formaldehyde resin-modified, amino group-containing epoxy resin produced in the manner described above and is suitably used in water base coating materials, particularly electrodepositable coating materials.

The xylene-formaldehyde resin-modified, amino group-containing epoxy resin according to the present invention is used in combination with, for example, a cross-linking agent such as blocked polyisocyanate and a melamine resin, particularly a blocked polyisocyanate cross-linking agent, whereby a thermosetting cationic coating composition can be prepared.

The blocked polyisocyanate cross-linking agent described above is an addition reaction product of a polyisocyanate compound with an isocyanate blocking agent in almost stoichiometric amounts. The polyisocyanate compound used in this case includes, for example, aromatic, aliphatic or alicyclic polyisocyanate compounds such as tolylenediisocyanate, xylilenediisocyanate, phenylenediisocyanate, diphenylmethane-2,4'-diisocyanate, diphenylmethane-4,4'-diisocyanate (usually called as "MDI"), crude MDI, bis(isocyanatemethyl)cyclohexane, tetramethylenediisocyanate, hexamethylenediisocyanate, methylenediisocyanate and isophoronediisocyanate; cyclized polymers and isocyanate biuret compounds of these polyisocyanate compounds; and terminal isocyanate group-containing compounds obtained by reacting excess amounts of these polyisocyanate compounds with low molecular active hydrogen-containing compounds such as ethylene glycol, propylene glycol, trimethylolpropane, hexanetriol and castor oil. They each can be used alone or in combination of two or more kinds thereof.

On the other hand, the isocyanate blocking agents described above are added to isocyanate groups of the polyisocyanate compounds to block them, and the blocked polyisocyanate compounds formed by addition thereof are stable at a room temperature. However, when they are heated at a baking temperature (usually, about 100 to about 200° C.) of the coating film, the blocking agent is preferably dissociated, and the free isocyanate groups can be regenerated. The blocking agent satisfying such requisite includes, for example, lactam base compounds such as ε-caprolactam and γ-butyrolactam; oxime base compounds such as methyl ethyl ketoxime and cyclohexanoneoxime; phenol base compounds such as phenol, p-t-butylphenol and cresol; aliphatic alcohols such as n-butanol and 2-ethylhexanol; aromatic alkylalcohols such as phenylcarbinol and methylphenylcarbinol; and ether alcohol base compounds such as ethylene glycol monobutyl ether and diethylene glycol monoethylether.

Each of these blocking agents can be used alone or in combination of two or more kinds thereof.

In addition to these blocking agents, capable of being used as blocking agents are a diol (1) with a molecular weight of 76 to 150 having two hydroxyl groups having different reactivities from each other and a carboxyl group-containing diol (2) having a molecular weight of 106 to 500. The diol (1) described above has two hydroxyl groups having different reactivities, for example, a combination of a primary hydroxyl group and a secondary hydroxyl group, a primary hydroxyl group and a tertiary hydroxyl group or a secondary hydroxyl group and a tertiary hydroxyl group and has a molecular weight of 76 to 150. Capable of being given are, for example, diols having two hydroxyl groups having different reactivities such as propylene glycol, dipropylene glycol, 1,3-butanediol, 1,2-butanediol, 3-methyl-1,2-butanediol, 1,2-pentanediol, 1,4-pentanediol, 3-methyl-4,3-pentanediol, 3-methyl-4,5-pentanediol, 2,2,4-trimethyl-1,3-pentanediol, 1,5-hexanediol and 1,4-hexanediol. Among them, propylene glycol is suited from the viewpoints of a reactivity of blocked polyisocyanate, a reduction in the heating loss and a storage stability of the coating material. In these diols (1), a hydroxyl group having a higher reactivity is usually reacted with an isocyanate group to block the isocyanate group.

Carboxyl group-containing diols having a molecular weight of 106 to 500 are included in the carboxyl group-containing diol (2) described above, and the carboxyl group present in the molecule makes it possible to elevate the low temperature dissociative property to raise the curability at a low temperature. In particular, when an organic tin compound is used as the curing catalyst, the curability at a low temperature can be elevated to a large extent. Capable of being given as the carboxyl group-containing diol (2) are, for example, 2,2-dimethylolpropionic acid, 2,2-dimethylolbutanoic acid, dimethylolvaleric acid and glyceric acid.

A blending proportion of the xylene-formaldehyde resin-modified, amino group-containing epoxy resin to the blocked polyisocyanate cross-linking agent in the cationic coating composition of the present invention, based on the total solid matter weight of these both components, can be allowed to fall in a range of generally 50 to 85% by weight, preferably 55 to 80% by weight and more preferably 55 to 78% by weight in the case of the xylene-formaldehyde resin-modified, amino group-containing epoxy resin, and generally 15 to 55% by weight, preferably 20 to 45% by weight and more preferably 22 to 45% by weight in the case of the blocked polyisocyanate cross-linking agent.

The cationic coating composition of the present invention comprising the xylene-formaldehyde resin-modified, amino group-containing epoxy resin and the blocked polyisocyanate cross-linking agent described above can be prepared, for example, by sufficiently mixing the xylene-formaldehyde resin-modified, amino group-containing epoxy resin and the blocked polyisocyanate cross-linking agent and then neutralizing the mixture with water-soluble organic carboxylic acid usually in an aqueous medium to make the above epoxy resin water-soluble or water-dispersible. Acetic acid, formic acid or a mixture thereof is particularly suited as the organic carboxylic acid used for neutralization, and use of these acids elevates a finishing property, a throwing property and a low temperature-curing property of the coating composition formed and a stability of the coating material.

A bismuth compound can be added as a rust preventive to the coating composition of the present invention. The kind of the bismuth compound which can be blended shall not specifically be restricted and includes, for example, inorganic bismuth compounds such as bismuth oxide, bismuth hydroxide, basic bismuth carbonate, bismuth nitrate and bismuth silicate. Among them, bismuth hydroxide is particularly preferred.

Capable of being also used as the bismuth compound are organic acid bismuth salts which are produced by reacting two or more organic acids with the bismuth compounds described above and in which at least one of the above organic acids is aliphatic hydroxycarboxylic acid. The organic acids which can be used for producing the above organic acid bismuth salts include, for example, glycolic acid, glyceric acid, lactic acid, dimethylolpropionic acid, dimethylolbutyric acid, dimethylolvaleric acid, tartaric acid, malic acid, hydroxymalonic acid, dihydroxysuccinic acid, trihydroxysuccinic acid, methylmalonic acid, benzoic acid and citric acid.

The inorganic bismuth compounds and the organic acid bismuth salts described above each can be used alone or may be used in combination of two or more kinds thereof.

A content of these bismuth compounds in the coating composition of the present invention shall not strictly be restricted and can be changed over a wide range according to performances required to the coating material. Usually, it falls suitably in a range of 0 to 10% by weight, preferably 0.05 to 5% by weight based on the resinous solid matters contained in the coating composition of the present invention.

Further, the coating composition of the present invention can contain, if necessary, a tin compound as a curing catalyst. The above tin compound includes, for example, organic tin compounds such as dibutyltin oxide and dioctyltin oxide; and aliphatic or aromatic carboxylic acid salts of dialkyltin such as dibutyltin dilaurate, dioctyltin dilaurate, dibutyltin diacetate, dioctyltin benzoateoxy, dibutyltin benzoateoxy, dioctyltin dibenzoate and dibutyltin dibenzoate. Among them, dialkyltin aromatic carboxylic acid salts are suitable from a viewpoint of a low temperature curability.

A content of these tin compounds in the coating composition of the present invention shall not strictly be restricted and can be changed over a wide range according to performances required to the coating material. Usually, the tin content falls suitably in a range of 0.01 to 8 parts by weight, preferably 0.05 to 5.0 parts by weight per 100 parts by weight of the resinous solid matters contained in the coating material.

Further, the cationic coating composition of the present invention can be blended, if necessary, with coating material additives such as resins for modification (e.g., a xylene resin and an acrylic resin), a color pigment, an extender pigment, a rust preventive pigment, an organic solvent, a pigment dispersant and a surface-controlling agent.

The cationic coating composition of the present invention can be coated on a desired base material surface by cationic electrodeposition coating. In general, electrodeposition coating can be carried out on the condition of a loaded voltage of 100 to 400 V in an electrodepositing bath controlled usually to a bath temperature of about 15 to about 35° C., which comprises the coating composition of the present invention diluted by adding deionized water so that the solid matter concentration becomes about 5 to about 40% by weight, preferably 15 to 25% by weight and controlled to a pH falling in a range of 5.5 to 9.

A film thickness of an electrodeposited coating film which is formed using the coating composition of the present invention shall not specifically be restricted and falls preferably in a range of generally 10 to 40 µm, particularly 15 to 35 µm in terms of a cured coating film. A baking temperature of the coating film is suitably a temperature falling in a range of generally about 120 to about 200° C., preferably about 140 to about 180° C. on a coated article surface, and the baking time can be set preferably in an extent of 5 to 60 minutes, preferably 10 to 30 minutes.

The cationic coating composition of the present invention is suitably used as a cationically electrodepositable coating material, but it shall not be restricted thereto and can also be used as a solvent type coating material for a corrosion resistant primer of a steel plate for coating by a method such as electrostatic coating and roll coating.

Further, the coating composition of the present invention can be used as a two liquid type room temperature-drying coating material and an adhesive using a polyisocyanate compound and a melamine resin as a cross-linking agent.

The cationic coating composition of the present invention forms a cured coating film which is excellent in a corrosion resistance, an electrodepositable coating aptitude against a corrosion-resistant steel plate and an adhesive property to a base material and is useful as an undercoating material for car bodies, car parts and construction & building fields.

The present invention shall more specifically be explained below with reference to examples, but the present invention shall by no means be restricted to the examples. "Parts" and "%" show "parts by weight" and "% by weight" respectively.

PRODUCTION EXAMPLE 1

Production of a Xylene-formaldehyde Resin 1

A separable flask having a content volume of 2 liter equipped with a thermometer, a reflux condenser and a stirrer was charged with 240 g of 50% formalin, 55 g of phenol, 101 g of 98% industrial sulfuric acid and 212 g of metaxylene to react them at 84 to 88° C. for 4 hours. After finishing the reaction, the flask was stood still to separate a resin phase from a sulfuric acid aqueous phase, and then the resin phase was washed three times with water and subjected to stripping of unreacted metaxylene on the conditions of 20 to 30 mm Hg and 120 to 130° C. for 20 minutes to obtain 240 g of a phenol-modified xylene-formaldehyde resin having a viscosity of 1050 centipoise (25° C.).

PRODUCTION EXAMPLE 2

Production of a Xylene-formaldehyde Resin 2

An o-cresol-modified xylene-formaldehyde resin was obtained in the same manner as in Production Example 1, except that 55 g of o-cresol was substituted for 55 g of phenol.

PRODUCTION EXAMPLE 3

Production of a Xylene-formaldyde Resin 3

A nonylphenol-modified xylene-formaldehyde resin was obtained in the same manner as in Production Example 1, except that 55 g of nonylphenol was substituted for 55 g of phenol.

PRODUCTION EXAMPLE 4

Production of a Xylene-formaldehyde Resin-modified, Amino Group-containing Epoxy Resin No. 1

A flask was charged with 1,000 g of Epikote 828EL (trade name, epoxy resin manufactured by Japan Epoxy Resin Co., Ltd.; epoxy equivalent: 190 and molecular weight: 350), 400 g of bisphenol A and 0.2 g of dimethylbenzylamine, and they were reacted at 130° C. until the epoxy equivalent reached 750.

Then, 300 g of the xylene-formaldehyde resin 1 obtained in Production Example 1, 140 g of diethanolamine and 65 g of a ketimine compound of diethylenetriamine were added thereto to react them at 120° C. for 4 hours, and 420 g of butyl cellosolve was added subsequently to obtain a resin No. 1 having an amine value of 52 and a resin solid content of 80%.

PRODUCTION EXAMPLE 5

Production of a Xylene-formaldehyde Resin-modified, Amino Group-containing Epoxy Resin No. 2

The same operation as in Production Example 4 was carried out to obtain a resin No. 2 having an amine value of 52 and a resin solid content of 80%, except that in Production Example 4, 300 g of the xylene-formaldehyde resin 2 obtained in Production Example 2 was substituted for 300 g of the xylene-formaldehyde resin 1.

PRODUCTION EXAMPLE 6

Production of a Xylene-formaldehyde Resin-modified, Amino Group-containing Epoxy Resin No. 3

The same operation as in Production Example 4 was carried out to obtain a resin No. 3 having an amine value of 52 and a resin solid content of 80%, except that in Production Example 4, 300 g of the xylene-formaldehyde resin 3 obtained in Production Example 3 was substituted for 300 g of the xylene-formaldehyde resin 1.

PRODUCTION EXAMPLE 7

Production of a Xylene-formaldehyde Resin-modified, Amino Group-containing Epoxy Resin No. 4

Added to 400 g of PP-400 (trade name, polypropylene glycol manufactured by Sanyo Chemical Industrial Ltd.; molecular weight: 400) was 300 g of $\epsilon$-caprolactone, and the temperature was elevated to 130° C. Then, 0.01 g of tetrabutoxytitanium was added thereto, and the temperature was elevated to 170° C. Sampling was carried out with the passage of time while maintaining this temperature to trace an amount of unreacted $\epsilon$-caprolactone by infrared absorption spectrum measurement, and when the reaction rate reached 98% or more, the solution was cooled down to obtain a polyol compound 1.

Then, another flask was charged with 1,000 g of Epikote 828EL (trade name, epoxy resin manufactured by Japan Epoxy Resin Co., Ltd.; epoxy equivalent: 190 and molecular weight: 350), 400 g of bisphenol A and 0.2 g of dimethylbenzylamine, and they were reacted at 130° C. until the epoxy equivalent reached 750. Subsequently, 200 g of the xylene-formaldehyde resin 1 obtained in Production Example 1, 100 g of the polyol compound 1, 140 g of diethanolamine and 65 g of a ketimine compound of diethylenetriamine were added thereto to react them at 120° C. for 4 hours, and then 420 g of butyl cellosolve was added to obtain a resin No. 4 having an amine value of 52 and a resin solid content of 80%.

PRODUCTION EXAMPLE 8

Production of an Amino Group-containing Epoxy Resin No. 5

Added to 1,010 g of Epikote 828EL (trade name, epoxy resin manufactured by Japan Epoxy Resin Co., Ltd.) were 390 g of bisphenol A and 0.2 g of dimethylbenzylamine, and they were reacted at 130° C. until the epoxy equivalent reached 800. Then, 160 g of diethanolamine and 65 g of a ketimine compound of diethylenetriamine were added thereto to react them at 120° C. for 4 hours, and 355 g of butyl cellosolve was added subsequently to obtain a resin No. 5 having an amine value of 67 and a resin solid content of 80%.

PRODUCTION EXAMPLE 9

Production of a Blocked Polyisocyanate Curing Agent No. 1

Methyl isobutyl ketone 46 g was added to 270 g of Cosmonate M-200 (trade name, crude MDI manufactured by Mitsui Chemicals, Inc.), and the temperature was elevated to 70° C. Diethylene glycol monoethyl ether 281 g was slowly added thereto, and the temperature was then elevated to 90° C. Sampling was carried out with the passage of time while maintaining this temperature to confirm by infrared absorption spectrum measurement that absorption of unreacted isocyanate disappeared, whereby the solvent amount was controlled to obtain a blocked polyisocyanate curing agent No. 1 having a solid matter content of 90%.

PRODUCTION EXAMPLE 10

Production of a Blocked Polyisocyanate Curing Agent No. 2

A reaction vessel was charged with 270 parts of Cosmonate M-200 and 25 parts of methyl isobutyl ketone, and the temperature was elevated to 70° C. Slowly added thereto was 15 parts of 2,2-dimethylolbutanoic acid, and then 118 parts of ethylene glycol monobutyl ether was dropwise added thereto. They were reacted at 70° C. for one hour, and the solution was then cooled down to 60° C., followed by adding 152 parts of propylene glycol. Sampling was carried out with the passage of time while maintaining this temperature to confirm by infrared absorption spectrum measurement that absorption of an unreacted isocyanate group disappeared to obtain a blocked polyisocyanate curing agent No. 2 solution having a solid matter content of 80%.

PRODUCTION EXAMPLE 11

Production of a Blocked Polyisocyanate Curing Agent No. 3

A reaction vessel was charged with 270 parts of Cosmonate M-200 (trade name, crude MDI manufactured by Mitsui Chemicals, Inc.) and 4 g of methyl isobutyl ketone, and the temperature was elevated to 70° C. Slowly added thereto was 15 parts of 2,2-dimethylolbutanoic acid to react them at 70° C. for one hour, and the solution was then cooled down to 60° C., followed by adding 270 parts of propylene glycol. Sampling was carried out with the passage of time while maintaining this temperature to confirm by infrared absorption spectrum measurement that absorption of an unreacted isocyanate group disappeared to obtain a blocked polyisocyanate curing agent No. 3 solution having a solid matter content of 75%.

PRODUCTION EXAMPLE 12

Production of a Clear Emulsion (a) for Cationic Electrodeposition

Blended were 87.5 g (70 g in terms of a resin solid matter) of the resin No. 1 obtained in Production Example 4 described above, 33.3 g (30 g in terms of a resin solid matter) of the blocked polyisocyanate curing agent No. 1 obtained in Production Example 9 described above, 2.5 g of dibutyltin benzoate (solid matter content: 40%) and 15 g of 10% acetic acid, and they were stirred to homogeneity. Then, 158.7 g of deionized water was dropwise added in about 15 minutes while strongly stirring to obtain a clear emulsion (a) for cationic electrodeposition having a solid matter content of 34%.

PRODUCTION EXAMPLES 13 to 18

Production of Clear Emulsions (b) to (g) for Cationic Electrodeposition

Combinations shown in Table 1 were used to obtain emulsions (b), (c), (d), (e), (f) and (g) in the same manner as in Production Example 12.

PRODUCTION EXAMPLE 19

Production of a Clear Emulsion (h) for Cationic Electrodeposition

Blended were 73.8 g (59 g in terms of a resin solid matter) of the resin No. 5 obtained in Production Example 8, 33.3 g (30 g in terms of a resin solid matter) of the blocked polyisocyanate curing agent No. 1 obtained in Production Example 9, 11 g of the phenol-modified xylene-formaldehyde resin 1 obtained in Production Example 1, 2.5 g of dibutyltin benzoate (solid matter content: 40%) and 15 g of 10% acetic acid, and they were stirred to homogeneity. Then, 161.4 g of deionized water was dropwise added in about 15 minutes while strongly stirring to obtain a clear emulsion (h) for cationic electrodeposition having a solid matter content of 34%.

The compositions of the clear emulsions (a) to (h) for cationic electrodeposition are shown in Table 1.

TABLE 1

| Emulsion name | Production Example 12 (a) | Production Example 13 (b) | Production Example 14 (c) | Production Example 15 (d) | Production Example 16 (e) | Production Example 17 (f) | Production Example 18 (g) | Production Example 19 (h) |
|---|---|---|---|---|---|---|---|---|
| Resin No. 1 | 87.5 (70) | | | | 87.5 (70) | 87.5 (70) | | |
| Resin No. 2 | | 87.5 (70) | | | | | | |
| Resin No. 3 | | | 87.5 (70) | | | | | |
| Resin No. 4 | | | | 87.5 (70) | | | | |
| Resin No. 5 | | | | | | | 87.5 (70) | 73.8 (59) |
| Phenol-modified xylene-formaldehyde resin 1 | | | | | | | | 11.0 (11) |
| Blocked polyisocyanate curing agent No. 1 | 33.3 (30) | 33.3 (30) | 33.3 (30) | 33.3 (30) | | | 33.3 (30) | 33.3 (30) |
| Blocked polyisocyanate curing agent No. 2 | | | | | 33.3 (30) | | | |
| Blocked polyisocyanate curing agent No. 3 | | | | | | 33.3 (30) | | |
| Dibutyltin benzoate | 2.5 (1) | 2.5 (1) | 2.5 (1) | 2.5 (1) | 2.5 (1) | 2.5 (1) | 2.5 (1) | 2.5 (1) |
| 10% acetic acid | 15 | 15 | 15 | 15 | 15 | 15 | 15 | 15 |
| Deionized water | 158.7 | 158.7 | 158.7 | 158.7 | 158.7 | 158.7 | 158.7 | 161.4 |
| 34% emulsion | 297 (101) | 297 (101) | 297 (101) | 297 (101) | 297 (101) | 297 (101) | 297 (101) | 297 (101) |

Production of Pigment-dispersed Paste

Added to 5.83 parts of a 60% quaternary epoxy chloride resin, 14.5 parts of titanium white, 0.4 part of carbon black, 7.0 parts of an extender pigment and 2.0 parts of bismuth hydroxide was 2.24 parts of deionized water, and the mixture was sufficiently stirred to obtain a pigment-dispersed paste having a solid content of 55%.

EXAMPLES

Comparative Examples

Example 1

Added to 297 parts of the clear emulsion (a) for cationic electrodeposition were 49.8 parts of the pigment-dispersed paste and 235.7 parts of deionized water to obtain a cationically electrodepositable coating material having a solid content of 20%.

Examples 2 to 6

Comparative Examples 1 and 2

The pigment-dispersed paste and deionized water were added in the same manner as in Example 1 to each of the clear emulsions (b) to (h) for cationic electrodeposition in the same blending proportions as in Example 1 to obtain cationically electrodepositable coating materials having a solid content of 20%.

Coating Test

A zinc-plated steel plate of 0.8×150×70 mm subjected to chemical conversion treatment with Palbond #3020 (trade name, a zinc phosphate treating agent, marketed by Nihon Parkerizing Co., Ltd.) was dipped in the respective cationically electrodepositable coating materials obtained in Examples and Comparative Examples described above to carry out electrodepositable coating using them as a cathode (coating voltage of rust resistant steel plate: 270 V). Electrodeposited coating films thus formed were baked by means of an electric hot air dryer. The performance test results of the coated plates thus obtained are shown in the following Table 2.

and 170° C. for 20 minutes to thereby obtain electrodepositably coated plates, and cross-cut scratches were provided on the electrodeposited coating films of the respective electrodepositably coated plates thus obtained by means of a knife so that they reached the base surface. They were subjected to an 840 hour salt water-spraying resistant test according to JIS Z-2371 to evaluate a width of rust and blister produced in the cut part according to the following criteria:

⊚: maximum width of rust and blister was less than 2 mm (one side) from the cut part, and blister was not observed to be produced on the whole coated surface ○: maximum width of rust and blister was 2 mm or more and less than 3 mm (one side) from the cut part, and blister was not observed to be produced on the whole coated surface Δ: maximum width of rust and blister was 3 mm or more and less than 4 mm (one side) from the cut part, and blister was observed to be produced on a part of the coated surface x: maximum width of rust and blister was 4 mm or more from the cut part, and/or blister was observed to be produced on the whole coated surface (Remark 3) Impact Resistance The respective test plates obtained by applying the cationically electrodepositable coating material and baking it in

TABLE 2

| Clear emulsion | | Example 1 (a) | Example 2 (b) | Example 3 (c) | Example 4 (d) | Example 5 (e) | Example 6 (f) | Comparative Example 1 (g) | Comparative Example 2 (h) |
|---|---|---|---|---|---|---|---|---|---|
| Performance of coating film | | | | | | | | | |
| Electrodeposition aptitude of rust preventive steel plate (remark 1) | | ○ | ○ | ○ | ○ | ○ | ○ | Δ | ○ |
| Corrosion resistance (remark 2) | 150° C. | ○ | ○ | ○ | ○ | ⊚ | ⊚ | x | x |
| | 170° C. | ⊚ | ⊚ | ⊚ | ⊚ | ⊚ | ⊚ | ○ | Δ |
| Impact resistance (remark 3) | 150° C. | 40 | 40 | 40 | 40 | 50< | 50< | 10 | 20 |
| | 170° C. | 50< | 50< | 50< | 50< | 50< | 50< | 20 | 40 |
| Water resistant secondary adhesive property (remark 4) | 150° C. | ○ | ○ | ○ | ○ | ○ | ○ | Δ | x |
| | 170° C. | ○ | ○ | ○ | ○ | ○ | ○ | ○ | ○ |
| Low temperature elasticity (remark 5) | 150° C. | ○ | ○ | ○ | ○ | ○ | ○ | x | x |
| | 170° C. | ○ | ○ | ○ | ○ | ○ | ○ | x | x |
| Curability (remark 6) | 150° C. | ○ | ○ | ○ | ○ | ⊚ | ⊚ | Δ | x |
| | 170° C. | ○ | ○ | ○ | ○ | ⊚ | ⊚ | ○ | ○ |

The performance tests were carried out according to the following methods.

(Remark 1) Electrodeposition Aptitude of Rust Preventive Steel Plate

A zinc-plated steel plate used as a cathode was dipped in an electrodepositing bath to carry out cationically electrodepositable coating at a voltage of 270 V and a bath temperature of 28° C. and baked at 170° C. for 20 minutes for curing to obtain a test piece, and the number of pin holes in 10×10 cm of the test piece thus obtained was counted and evaluated according to the following criteria:

○: no pin holes were observed

Δ: 3 to 5 pin holes were observed x: 10 or more pin holes were observed (Remark 2) Corrosion Resistance The cationically electrodepositable coating material was applied and baked in two stages of 150° C. for 20 minutes two stages of 150° C. for 20 minutes and 170° C. for 20 minutes were put in a constant temperature and constant humidity chamber having a temperature of 20±1° C. and a humidity of 75±2% for 24 hours. Then, a pedestal and an impact pin each having a prescribed size were installed to a Du Pont impact tester, and the test plate was interposed between them with the coated face thereof turned upward. Subsequently, a deadweight having a weight of 500 g was fallen onto the impact pin to determine a maximum height (cm) at which cracking and peeling of the coating film were not caused by impact.

(Remark 4) Water Resistant Secondary Adhesive Property

The cationically electrodepositable coating material was applied on a zinc-plated steel plate and baked in two stages of 150° C. for 20 minutes and 170° C. for 20 minutes to thereby obtain a test plate. Further, TP-65 Grey (trade name, an aminoalkide base intermediate coating material, manufactured by Kansai Paint Co., Ltd.) and NEO AMILAC 6000 (trade name, an aminoalkid base top coating material, manufactured by Kansai Paint Co., Ltd.) were applied in order on the test plate, and it was baked and cured to obtain a coated plate. It was immersed in warm water of 40° C. for 10 days and then provided with cross-cuts of 2 mm square, and it was subjected to a peeling test with a cellophane adhesive tape to evaluate a residual rate (residual cross-cuts/100) of the coating film according to the following criteria:

◯: 100/100

Δ: 90 to 99/100 x: not more than 89/100

(Remark 5) Low Temperature Elasticity

A cationically electrodepositable coating film test plate obtained by baking in two stages of 150° C. for 20 minutes and 170° C. for 20 minutes was put in a constant temperature and constant humidity chamber having a temperature of minus 20±1° C. and a humidity of 75±2% for 24 hours and then bent by 180° C. in 1 to 2 seconds to evaluate front and back surfaces in the bent part according to the following criteria:

◯: nothing unusual was found on both front and back surfaces x: anything unusual such as cracking and peeling was found on either of them (Remark 6) Curability A coated surface of a cationically electrodepositably coated plate obtained by baking in two stages of 150° C. for 20 minutes and 170° C. for 20 minutes was rubbed by about 20 reciprocations in a length of about 3 to about 4 cm at a pressure of 0.392 MPa (about 4 kgf/cm$^2$) with a set of four gauzes soaked with acetone, and then the coated surface appearance was visually observed to evaluate it according to the following criteria:

⊚: no scratches were observed on the coated surface by 30 reciprocations

◯: no scratches were observed on the coated surface by 20 reciprocations

Δ: scratches were observed on the coated surface by 20 reciprocations but no base surface was seen x: coating film was dissolved by 20 reciprocations, and base surface was seen

What is claimed is:

1. A cationic coating composition comprising as a vehicle component, a xylene-formaldehyde resin-modified, amino group-containing epoxy resin obtained by reacting an epoxy resin (A) having an epoxy equivalent of 180 to 2500 with a xylene-formaldehyde resin (B) and an amino group-containing compound (C).

2. The cationic coating composition as set forth in claim 1, wherein the epoxy resin (A) is obtained by reacting a polyphenol compound with epihalohydrin.

3. The cationic coating composition as set forth in claim 2, wherein the polyphenol compound is bisphenol A.

4. The cationic coating composition as set forth in claim 1, wherein the epoxy resin (A) has an epoxy equivalent falling in a range of 200 to 2000.

5. The cationic coating composition as set forth in claim 1, wherein the xylene-formaldehyde resin (B) has a phenolic hydroxyl group.

6. The cationic coating composition as set forth in claim 1, wherein the xylene-formaldehyde resin (B) is obtained by subjecting xylene, formaldehyde and phenols to condensation reaction in the presence of an acid catalyst.

7. The cationic coating composition as set forth in claim 1, wherein the xylene-formaldehyde resin (B) is obtained by reacting a xylene-formaldehyde resin with phenols in the presence of an acid catalyst.

8. The cationic coating composition as set forth in any of claims 1 to 7, wherein the xylene-formaldehyde resin (B) has a phenolic hydroxyl group equivalent falling in a range of 100 to 50,000.

9. The cationic coating composition as set forth in claim 6 or 7, wherein the phenols are selected from the group consisting of phenol and cresols.

10. The cationic coating composition as set forth in claim 1, wherein the xylene-formaldehyde resin (B) has a viscosity falling in a range of 20 to 50,000 centipoise (25° C.).

11. The cationic coating composition as set forth in claim 1, wherein the xylene-formaldehyde resin-modified, amino group-containing epoxy resin is obtained by reacting the epoxy resin (A) with the xylene-formaldehyde resin (B) and the amino group-containing compound (C) at the same time.

12. The cationic coating composition as set forth in claim 1, wherein the xylene-formaldehyde resin-modified, amino group-containing epoxy resin is prepared by reacting 50 to 90% by weight of the epoxy resin (A), 5 to 45% by weight of the xylene-formaldehyde resin (B) and 5 to 25% by weight of the amino group-containing compound (C) each based on the total solid matter weight of the epoxy resin (A), the xylene-formaldehyde resin (B) and the amino group-containing compound (C).

13. The cationic coating composition as set forth in claim 1, comprising as a vehicle component, a xylene-formaldehyde resin-modified, amino group-containing epoxy resin obtained by reacting the epoxy resin (A) with the xylene-formaldehyde resin (B), the amino group-containing compound (C) and a polyol compound (D) obtained by adding caprolactone to a compound containing plural active hydrogen groups.

14. The cationic coating composition as set forth in claim 13, wherein an active hydrogen group in the compound having plural active hydrogen groups is selected from the group consisting of an alcoholic hydroxyl group, a primary amino group and a secondary amino group.

15. The cationic coating composition as set forth in claim 13 or 14, wherein the compound having plural active hydrogen groups is selected from the group consisting of low molecular weight polyols, linear or branched polyetherpolyols, linear or branched polyesterpolyols and hydroxyamino compounds having a primary amino group and/or a secondary amino group in combination with a hydroxyl group.

16. The cationic coating composition as set forth in claim 13, wherein caprolactone is ε-caprolactone.

17. The cationic coating composition as set forth in claim 13, wherein an added molar amount of caprolactone to the compound having plural active hydrogen groups falls in a range of 1 to 30 moles per equivalent of the active hydrogen group.

18. The cationic coating composition as set forth in claim 13, wherein the xylene-formaldehyde resin-modified, amino group-containing epoxy resin is obtained by reacting the epoxy resin (A) with the xylene-formaldehyde resin (B), the amino group-containing compound (C) and the polyol compound (D) at the same time.

19. The cationic coating composition as set forth in claim 13, wherein the xylene-formaldehyde resin-modified, amino group-containing epoxy resin is prepared by reacting 50 to 85% by weight of the epoxy resin (A), 5 to 45% by weight of the xylene-formaldehyde resin (B), 5 to 25% by weight of the amino group-containing compound (C) and 1 to 20% by weight of the polyol compound (D) each based on the total solid matter weight of the epoxy resin (A), the xylene-formaldehyde resin (B), the amino group-containing compound (C) and the polyol compound (D).

20. The cationic coating composition as set forth in claim 1, further comprising a blocked polyisocyanate cross-linking agent obtained by blocking a polyisocyanate compound with a blocking agent.

21. The cationic coating composition as set forth in claim 20, wherein the blocked polyisocyanate cross-linking agent is obtained by reacting an active hydrogen-containing component comprising a diol (1) with a molecular weight of 76 to 150 having two hydroxyl groups having different reactivities from each other and a carboxyl group-containing diol (2) having a molecular weight of 106 to 500 with a polyisocyanate compound.

22. The cationic coating composition as set forth in claim 1, further comprising a bismuth compound as a rust preventive.

23. A cationically electrodepositing bath comprising the cationic coating composition as set forth in claim 1.

24. A cationic electrodeposition-coating method comprising coating the cationic coating composition by cationic electrodeposition as set forth in claim 1.

25. An article coated with the cationic coating composition as set forth in claim 1.

* * * * *